(12) United States Patent
Busi et al.

(10) Patent No.: US 7,525,905 B2
(45) Date of Patent: Apr. 28, 2009

(54) METHOD FOR THE PROTECTION OF THE CONNECTION BETWEEN A TRANSPORT NETWORK HUB AND A CENTRAL SITE/POP

(75) Inventors: Italo Busi, Cerro Maggiore (IT); Pietro Vittorio Grandi, Milan (IT); Michele Fontana, Verderio Superiore (IT)

(73) Assignee: Alcatel, Paris (FR)

( * ) Notice: Subject to any disclaimer, the term of this patent is extended or adjusted under 35 U.S.C. 154(b) by 706 days.

(21) Appl. No.: 10/959,397

(22) Filed: Oct. 7, 2004

(65) Prior Publication Data

US 2005/0129062 A1 Jun. 16, 2005

(30) Foreign Application Priority Data

Dec. 11, 2003 (EP) .................................. 03293118

(51) Int. Cl.
*H04J 1/16* (2006.01)
(52) U.S. Cl. ...................................... 370/221; 370/225
(58) Field of Classification Search ................. 370/219, 370/220, 225, 228, 468, 473, 477, 216, 223
See application file for complete search history.

(56) References Cited

U.S. PATENT DOCUMENTS

| | | | |
|---|---|---|---|
| 6,219,336 B1 * | 4/2001 | Takahashi et al. ........... | 370/223 |
| 6,829,215 B2 * | 12/2004 | Tornar ......................... | 370/223 |
| 6,950,391 B1 * | 9/2005 | Zadikian et al. ............. | 370/219 |
| 6,956,816 B1 * | 10/2005 | Alexander et al. ........... | 370/222 |
| 2004/0042416 A1 * | 3/2004 | Ngo et al. .................... | 370/254 |
| 2005/0088963 A1 * | 4/2005 | Phelps et al. ................ | 370/216 |

FOREIGN PATENT DOCUMENTS

WO WO 02/099676 A1 12/2002

OTHER PUBLICATIONS

Kallgren O et al: "Protection Switching Systems 1:1 and 1:N" On-Ericsson Review, Ericsson. Stockholm, SE, vol. 64, No. 2, 1987, pp. 85-92, XP000029422.
Varadarajan S et al: "Automatic fault detection and recovery in real time switched Ethernet networks" INFOCOM '99. Eighteenth Annual Joint Conference of the IEE Computer and Communications Societies. Proceedings. IEE New York, NY, USA Mar. 21-25, 1999, Picataway, NJ, USA, IEEE, US, Mar. 21, 1999, pp. 161-169, XP010323731.
ITU-T (International Telecommunication Untion, G.709/Y.1331 Mar. 2003.

* cited by examiner

*Primary Examiner*—Ricky Ngo
*Assistant Examiner*—Kan Yuen
(74) *Attorney, Agent, or Firm*—Sughrue Mion, PLLC

(57) ABSTRACT

The present invention provides for a method for Enhanced Equipment Protection Switch for Customer's device Dual-Homing, in an interconnection between a Central site/Pop and a Transport Network Hub by two boards. Each board is simultaneously connected to the Switching Matrix of the Transport Network Hub with B/2 bandwidth. Both boards receive the band B from the Central site/Pop, and send half a band B/2 directly to the Switching Matrix, and the other half band B/2 to the other board.

11 Claims, 9 Drawing Sheets

METHOD FOR THE PROTECTION OF THE CONNECTION BETWEEN A TRANSPORT NETWORK HUB AND A CENTRAL SITE/POP

FIELD OF THE INVENTION

The present invention relates in particular to a method for the protection of the connection between a Transport Network Hub and a Central Site/Pop via Ethernet interfaces. This application is based on, and claims the benefit of, European Patent Application No. 03293118.0 filed on Dec. 11, 2003, which is incorporated by reference herein.

BACKGROUND OF THE INVENTION

The context is e.g. the Hub transport network, shown in FIG. 1, Where several Customer Boxes CB1 . . . CBn (owned by the same customer or by different customers) have to be interconnected with a Central Site/Pop CSP via an Ethernet interface. The Central site/PoP CSP is the Hub of the data traffic among Data Boxes (not shown in FIG. 1) which can be either Routers or LAN Switches.

In order to guarantee the connectivity required by the Data Boxes, the transport network TN has to assume a Hub logical topology, in which the Customer Boxes CB1 . . . CBn connect through respective leaves LF1 . . . LFn to a Transport Network Hub TNH, in turn connected to CSP. The Transport Network transmission layer may be SDH, SONET, or ODU (Optical Layer as defined in the Recommendation ITU-T G709).

The technical problem to be solved in this context is to protect the connection between the Central Site/Pop CSP and the Transport network Hub TNH.

For protection purpose it is known to use the so-called Dual Homing Interconnection protection and/or the Equipment Protection Switching (EPS) techniques.

However in case of Hub transport network topology, there is no known way to assure the Dual Homing interconnection that is able to deal with standard external Data Boxes. It is not possible to rely on proprietary signaling because this is not supported by external Data boxes.

As far as the known EPS mechanism is concerned, usually there is an "Active" board really working by receiving and sending traffic and a "Standby" board that is not working in the sense to receive and transmit traffic, as it works only for protection of the "Active" board. Typically the "Active board" is connected to the Switching Matrix of the Transport network, while "Standby" board is disconnected from the Switching Matrix. All traffic is received/transmitted by the "Active" board and no traffic is received/transmitted by the "Standby" board. When a board failure occurs, "Active" and "Standby" roles are exchanged, and the former "Active" board becomes "Standby" and the former "Standby" board becomes "Active". The Switching Matrix will reroute traffic from one board to the other.

This traditional EPS protection however does not work for our purpose, as the Ethernet physical layer at the level of Central Site/Pop CSP is not able to detect mono-directional failures in link TX side (up-down direction from CSP to TNH) and consequently is not able to trigger the EPS mechanism.

The result is that there is no protection in case of a mono-directional failure.

SUMMARY OF THE INVENTION

Therefore the main object of the present invention is to solve the above problems and to provide a method and an apparatus for the protection of the connection between a Transport Network Hub and a Central Site/Pop preferably via Ethernet interfaces, as well as a hub transport network including the apparatus. In particular a method and apparatus for Enhanced Equipment Protection Switch (EPS) for Customer's device Dual-Homing, having a new Dual Homing interconnection and an Equipment Protection Switching (EPS) of the Transport Network Hub.

The Dual Homing interconnection will protect the Link Failure (and also the Central site/Pop in case of redundancy) between CSP and TNH, while the EPS will protect the Transport network's Hub failures at the level of TNH.

The basic idea of this proposal is to have again two boards, but now there is not anymore the distinction between Active board (connected to the Switching Matrix with e.g. bandwidth B) and Standby board (disconnected from the Switching Matrix). Each board now is simultaneously connected to the Switching Matrix with e.g. B/2 bandwidth. Both boards receive e.g. the band B from CSP, and send e.g. half a band B/2 directly to the Switching Matrix, and e.g. the other half band B/2 to the other board.

When a board failure occurs, the corresponding B/2 bandwidth of the failed board is rerouted by the Switching Matrix to the other board. In this case the only working board will be connected to the Switching Matrix with bandwidth B.

These and further objects are achieved by means of a device and a method, as well as a transport network hub, as described in the attached claims, which are considered an integral part of the present description.

By means of the present invention, a number of advantages are achieved.

This solution allows the implementation of an EPS procedure in an Hub topology without requiring proprietary modifications of the Spanning Tree Algorithm on the Switch/router.

As known, the Spanning-Tree Algorithm is a link management protocol that prevents undesirable loops in the Ethernet network.

The Spanning-Tree Algorithm defines a tree that spans all switches in an extended network. The Spanning-Tree Algorithm forces certain redundant data paths into a standby (blocked) state. If one network segment in the Spanning-Tree Algorithm becomes unreachable, or if the Spanning-Tree Algorithm costs change, the spanning-tree algorithm reconfigures the spanning-tree topology and reestablishes the link by activating the standby path.

The Spanning-Tree Algorithm is applied to every switch in a packet network. All the switches in the network speak each other and identify one of the switches as the root of a tree that describes the network. All the traffic has to pass through the root switch. While building the tree, the Spanning-Tree Algorithm detects all the loops in the networks and decides where to open them. The user, giving different weights to the links, can control the location of the link used to open a loop.

BRIEF DESCRIPTION OF THE DRAWINGS

The invention will become fully clear from the following detailed description, given by way of a mere exemplifying and non limiting example, to be read with reference to the attached drawing figures, wherein:

The same reference numerals and letters in the figures designate the same elements.

FIG. 1 has already been described above.

BEST MODE FOR CARRYING OUT THE INVENTION

Figure 1:
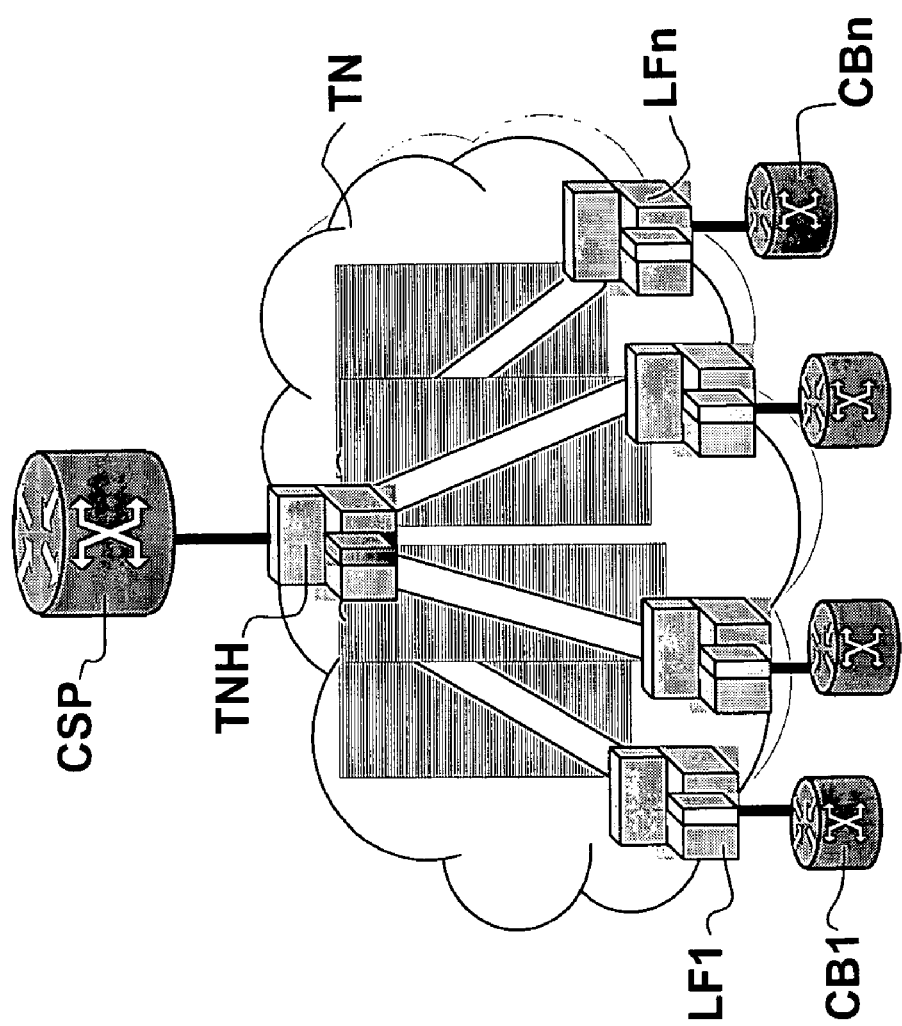
FIG. 1 shows a schematic diagram of a global network topology where the invention applies.

FIGS. 2 to 5 show the architectural configuration of the Transport Network Hub TNH in accordance with the invention, bidirectionally communicating with the Central Site/Pop CSP.

TNH basically comprises two transceiver boards TB1 and TB2 bidirectionally connected to the Central Site/Pop CSP, and a Switching Matrix MTRX bidirectionally connected to both the transceiver boards TB1 and TB2, and the Leaves LF1 . . . LFn. A total bandwidth capacity B is supposed to be available for each direction of communication in the network. The direction from CSP to TNH is called Transmission TX-side or Up-Down direction, shown by full-line arrows; the opposite direction from TNH to CSP is called Receiving RX-side or Bottom-Up direction, shown by empty-line arrows.

The transceiver boards TB1 and TB2 may be made in any known way. They comprise an Ethernet interface towards the Central Site/Pop CSP, and perform packet processing (classification, forwarding, encapsulation, queing, scheduling, shaping). TB1 and TB2 also perform termination function for the transport layer towards the Matrix MTRX, for packet extraction from the SDH/SONET/ODU frames.

Both boards TB1 and TB2 receive B/2 bandwidth of customer's traffic directly from the Matrix MTRX, coming from the Leaves LF1 . . . LFn, namely the traffic with a total bandwidth B coming from the customer boxes CB1 . . . CBn is in load sharing between the 2 boards.

The Switching Matrix MTRX applies switching criteria known per se to allocate customer's traffic to the two outputs towards boards TB1 and TB2. MTRX may be a matrix for SDH, SONET or ODU layer.

The remaining B/2 bandwidth between each board and the Matrix MTRX is used to interconnect the 2 boards together. In other words both boards are connected to the Matrix MTRX with a total bandwidth B: B/2 of it is customer's traffic and the other B/2 is the bandwidth rerouted from one board to the other, as better described below for each traffic direction.

The data traffic in the Up-Down (TX-side) direction flows in accordance with the following criteria.

All the traffic received by the boards TB1 or TB2 from CSP (bandwidth B) is classified and forwarded to the customer boxes via the Matrix MTRX with a total bandwidth B.

B/2 bandwidth is forwarded directly by a board (TB1 or TB2) to the Matrix MTRX, while the remaining B/2 bandwidth of traffic from the Ethernet interface is sent to the other board (TB2 or TB1) using the remaining B/2 bandwidth connection. The latter board, after receiving this B/2 bandwidth of customer's traffic from the other board will forward it to the customer boxes via the remaining B/2 bandwidth connected to the Matrix MTRX.

In the boards TB1 and TB2 the total bandwidth B is divided between the two boards according to any criteria which can be set by the service provider of the transport layer, so as to have anyway a total bandwidth B=B/2+B/2. For example one VC4 through one board and 63 VC12 through the other board, or one OD1 through one board and one OD1 through the other board, etc. . . .

This procedure will be followed by both boards.

It has to be noted that, according to the Spanning-Tree Algorithm decisions, the Central Site/Pop CSP will select only one Ethernet interface where to send out the traffic. If for example CSP will decide to send the bandwidth B of customer's traffic towards board TB1, this board will send B/2 bandwidth directly to customer boxes and B/2 bandwidth toward board TB2. Board TB2 then will send this B/2 bandwidth toward the customer boxes. In this case there is no traffic rerouting from board TB2 to board TB1 as no traffic is received directly by TB2 from CSP.

Generally, in accordance with the Spanning-Tree Algorithm, the data are not transmitted on links used to open loops. The link between CSP and TNH is never considered for loop opening.

The transport Network Element is transparent to the Spanning-Tree Algorithm messages sent by CSP. In particular, the Spanning-Tree Algorithm messages received by one board are rerouted to the other board in such a way as CSP can perceive a double loop. As a consequence, following the Spanning-Tree Algorithm criteria, CSP decides to cut one of the two connections towards the boards. Therefore the traffic flows thorugh only one board.

In case of link or board failure affecting the working link or board towards CSP, the Spanning-Tree Algorithm reopens the connection previously cut. In case of board failure affecting the board not connected to CSP, nothing happens for the Spanning-Tree Algorithm.

The data traffic in the Bottom-Up (RX-side) direction flows in accordance with the following criteria.

Considering each board TBi (i=1,2), the B/2 bandwidth of customer's traffic received from Matrix MTRX (with a total bandwidth B) is bi-casted to both CSP and the other board TBj(j=1,2 and j<>i). A total bandwidth B is available at both boards output towards CSP made up of a bandwidth B/2 coming from the same board and B/2 coming from the other board.

In any case the B/2 bandwidth of customer's traffic is sent out from the local Ethernet interface of TB1 or TB2 with no knowledge whether the router/switch CSP will process or discard it due to the Spanning Tree Algorithm decision on which board (TB1 or TB2) must be connected to CSP.

In the following some further explanation is given about the rerouted B/2 bandwidth between the 2 boards TB1 and TB2.

In RX side (Bottom-Up) direction, some B/2 bandwidth is received by each board from the other board. This B/2 bandwidth has to be "merged" with the other B/2 bandwidth coming from the Matrix MTRX and the resulting B bandwidth is sent out from the local Ethernet interface of either TB1 or TB2 to CSP.

In TX side (Up-Down) direction instead, there is a B/2 bandwidth received from the Local Ethernet interface of either TB1 or TB2 that has to be sent to the other board for proper forwarding to the Matrix MTRX, and there is another local B/2 bandwidth coming form the Matrix MTRX that, after bi-cast, has to be rerouted from one board towards the other board.

Clearly there can be a congestion because there is a (B/2+B/2) bandwidth trying to use an B/2 bandwidth channel in the Matrix MTRX. This potential congestion is solved by giving higher priority to the B/2 bandwidth coming from the local Ethernet interface with respect to the B/2 bandwidth coming from the Matrix MTRX in the same direction.

From an implementation point of view this can be solved with a strict priority scheduler.

As soon as there are some packets coming from the local Ethernet interface of the board connected to CSP, they are sent to the other board using the B/2 bandwidth channel in the Matrix MTRX (that can never be congested by this B/2 bandwidth). When these packets are not present, then the other packets coming from the Matrix MTRX can be sent to the other board using the same B/2 bandwidth channel. When both B/2 bandwidths from local interface and Matrix MTRX are present, some packets or all packets of the B/2 bandwidth from the Matrix MTRX are dropped, to fullfil the total bandwidth capacity of B/2.

It has to be noted that this is the correct policy because if some packets are received from the local Ethernet interface, these are coming from the Ethernet interface of the board connected to CSP by the Spanning-Tree Algorithm, and they must be delivered to the customer boxes through the Matrix MTRX. Instead the packets to be rerouted to the other board at the end will be lost as the other board is not connected to the working Ethernet interface towards CSP, so there is no problem in dropping them immediately instead to let them reach CSP and be dropped there.

Let's assume that the board TB1 is the board effectively connected to CSP by the Spanning-Tree Algorithm, and therefore the other board TB2 is not.

Figure 5:
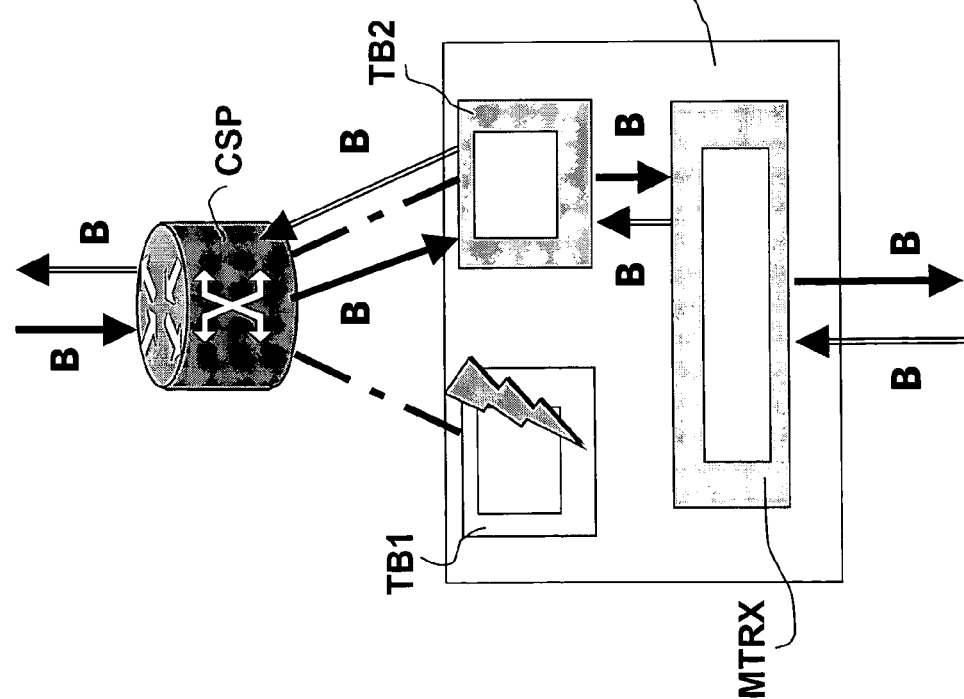
Figure 6:
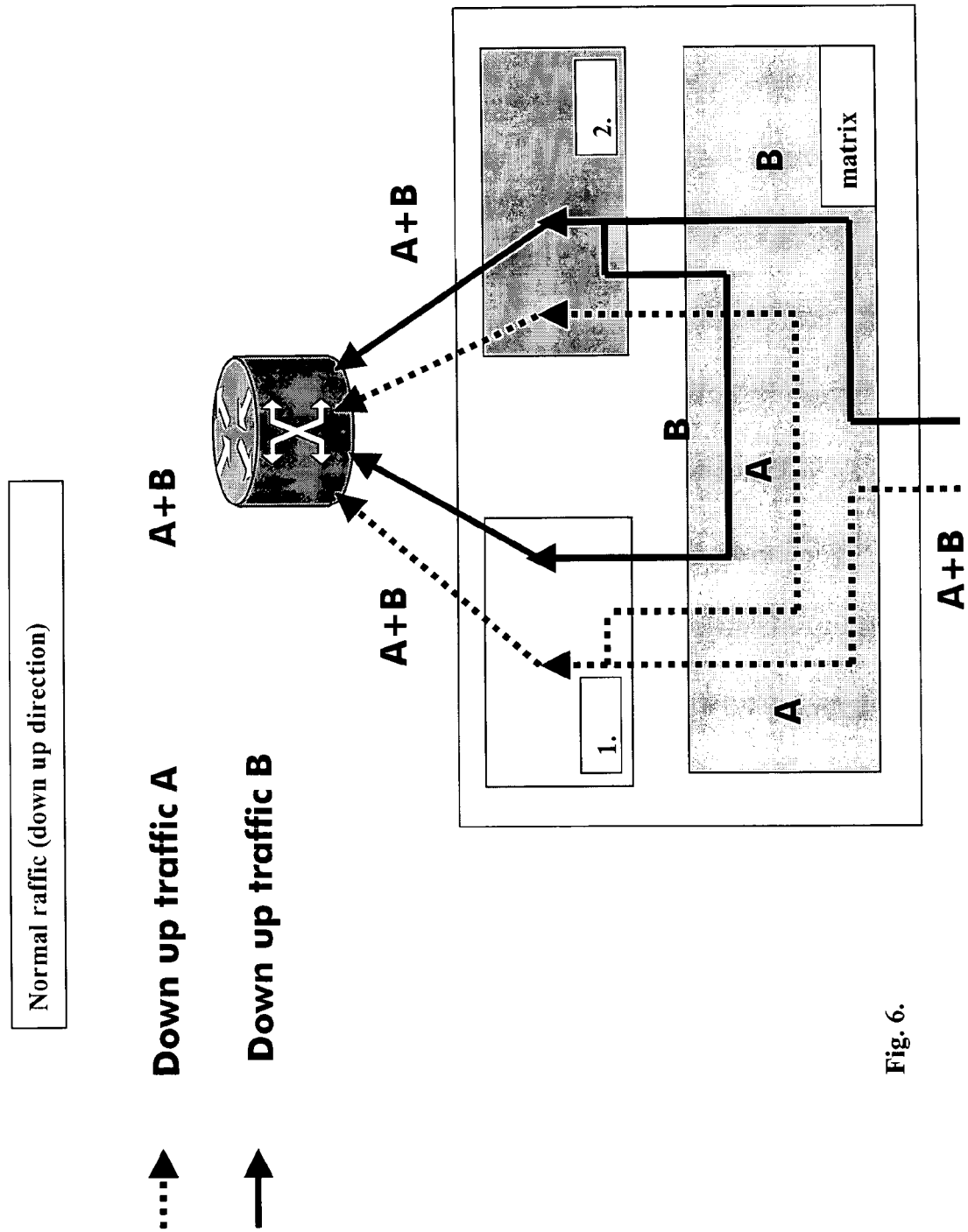
FIGS. 6 to 11 show physical schematic diagrams of the internal constitution of the Transport Network Hub TNH according to the invention, in different protection situations.
Figure 7:
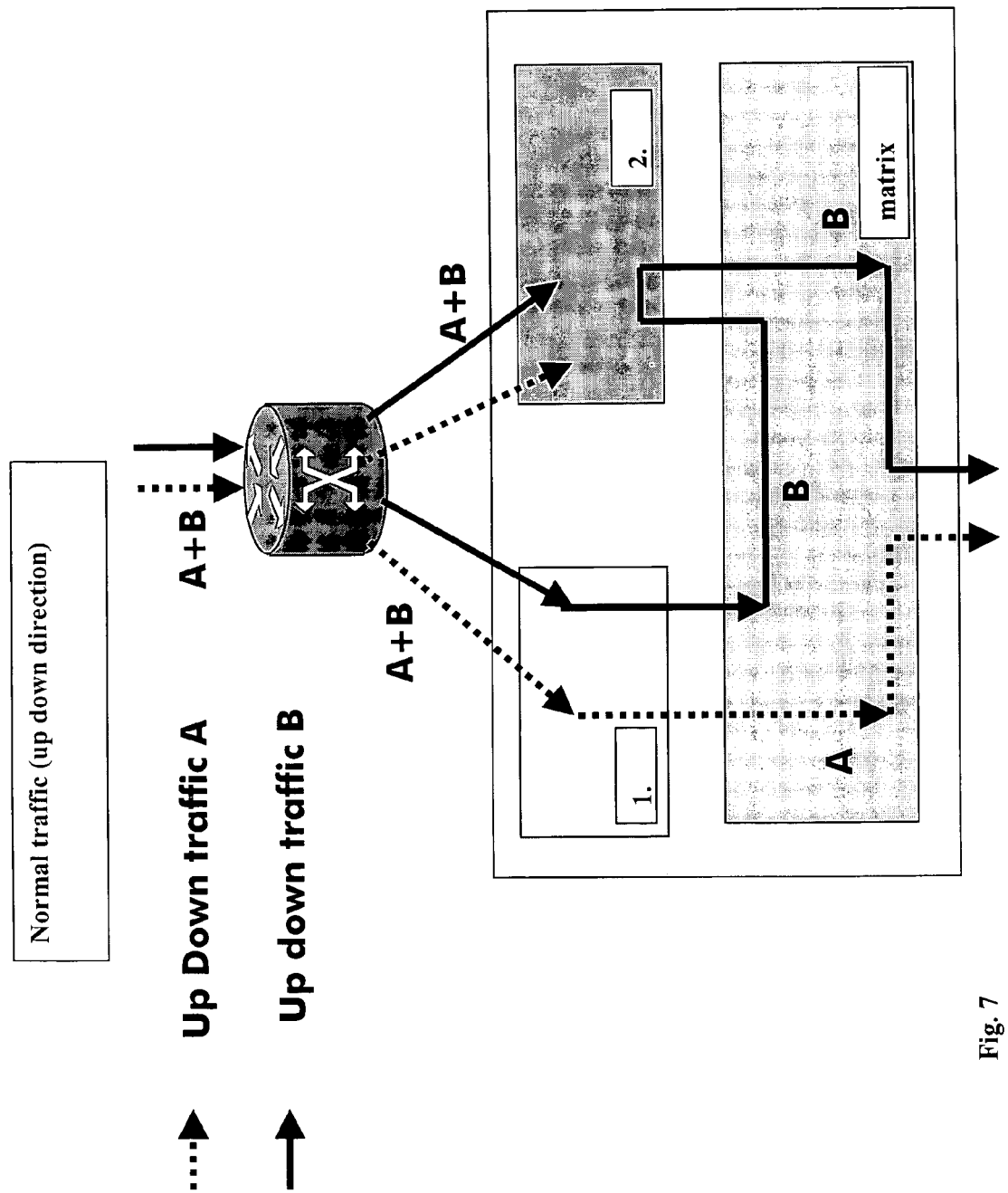
Figure 8:
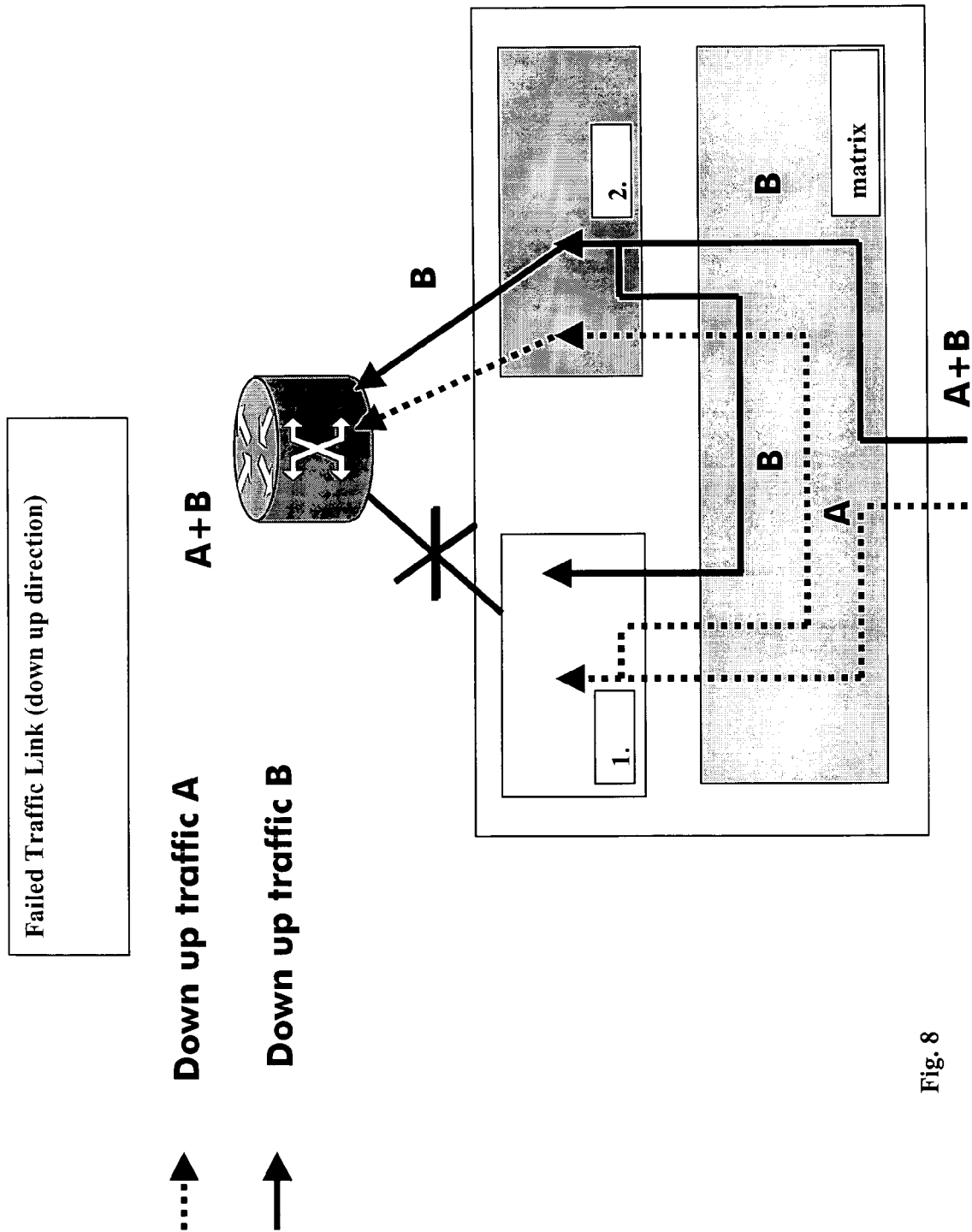
Figure 9:
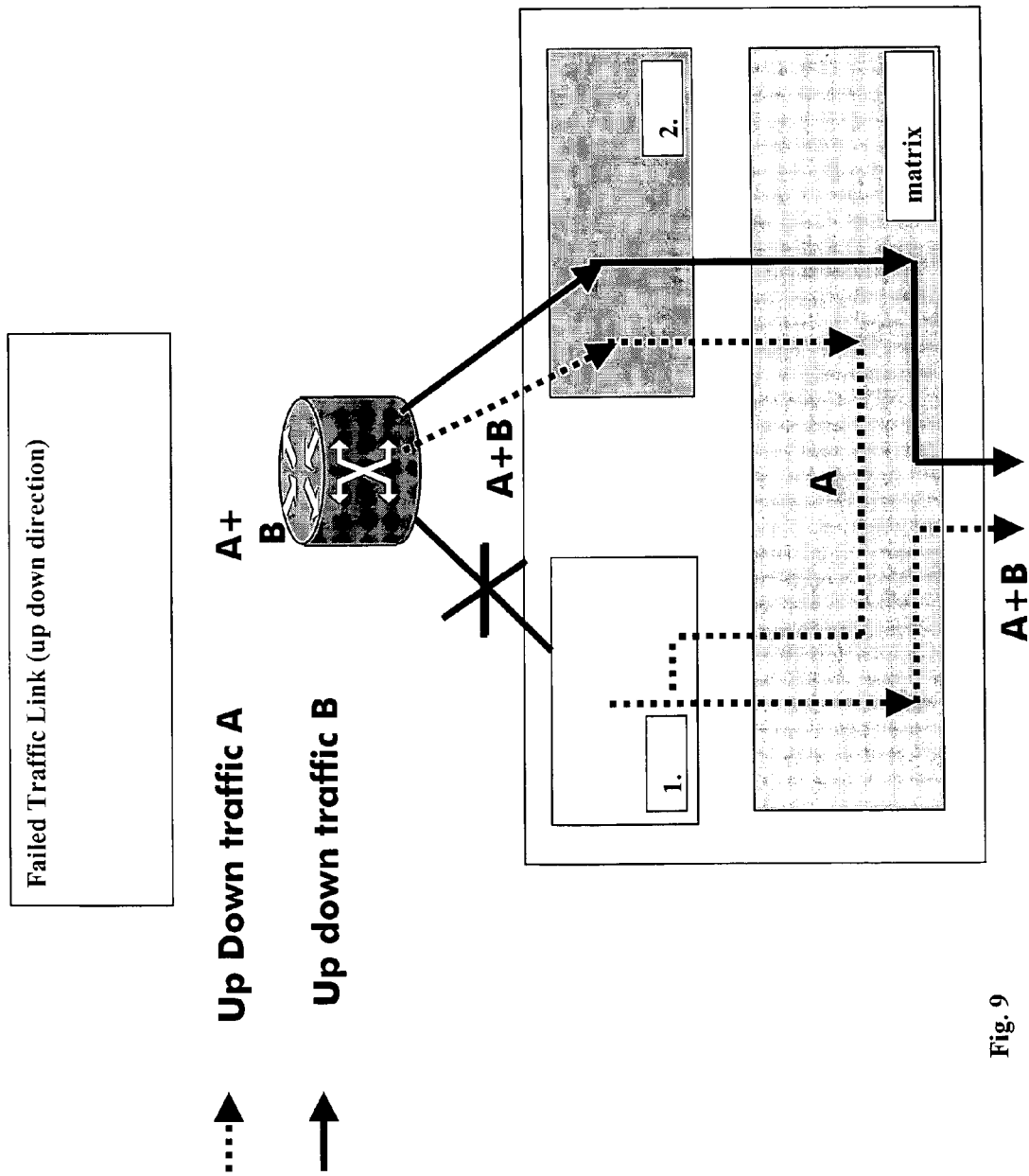
Figure 10:
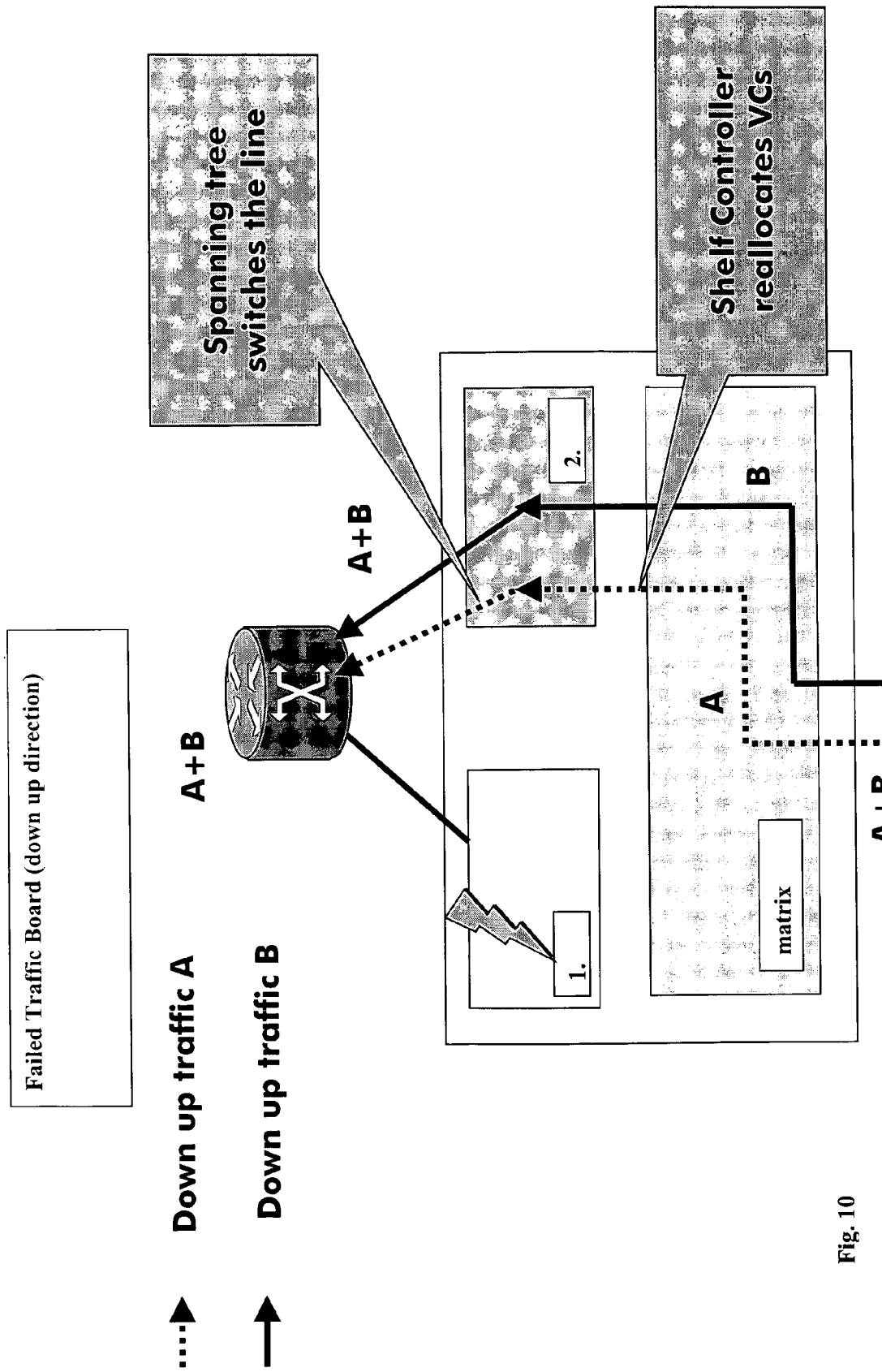
Figure 11:
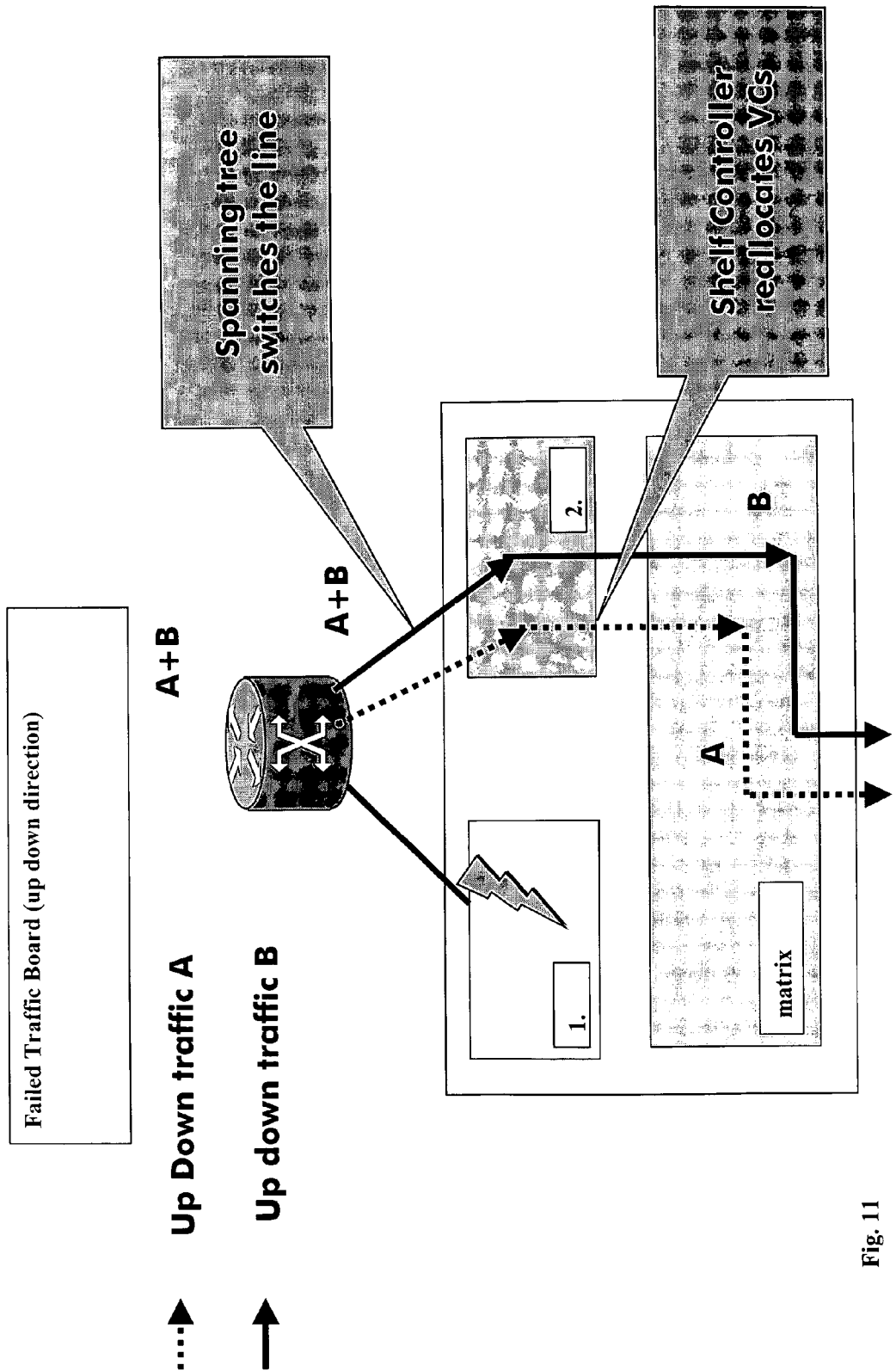

If there is a failure of board TB2, as shown in FIG. 5, the Matrix MTRX will reroute the B/2 bandwidth destined to TB2 towards TB1. Now TB1 will receive from the Matrix MTRX B/2 bandwidth from its original customer boxes and B/2 bandwidth from the customer boxes originally connected to TB2.

On the Up-Down direction all the received B bandwidth is forwarded by TB1 to customer boxes via the Matrix MTRX.

Nothing is perceived by customer boxes and router/switch Pop CSP.

Figure 4:
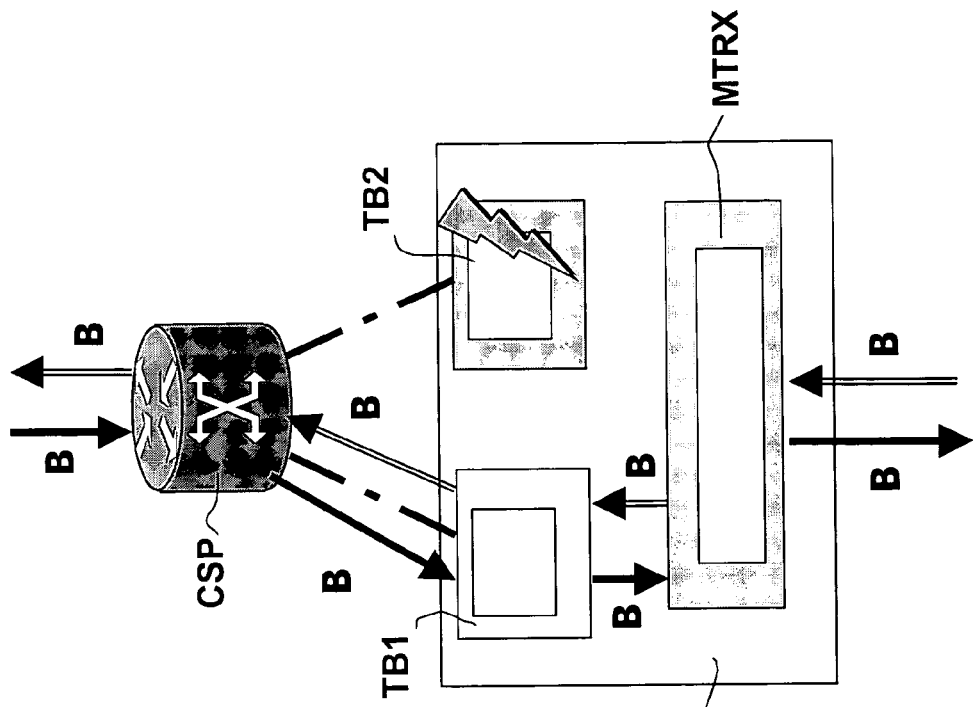

Instead, if there is a failure on board TB1, as shown in FIG. 4, the previous procedure also applies, and at the end the board TB2 will be connected to Matrix MTRX for a customer bandwidth of B/2+B/2.

As the board TB1 is failed, the Spanning-Tree Algorithm on the switch/router CSP will now select the Ethernet interface of board TB2.

The result of the failure on board TB1 is that the switch/router CSP has to change the working Ethernet interface. Nothing is required from customer side. The customers will only perceive a traffic interruption until when the Spanning-Tree Algorithm will reroute to the other Ethernet interface.

Let's now consider the case of a failure at link level between CSP and TNH.

A failure in the link connected to the board not connected to CSP has no practical consequence on the traffic flow.

Figure 3:
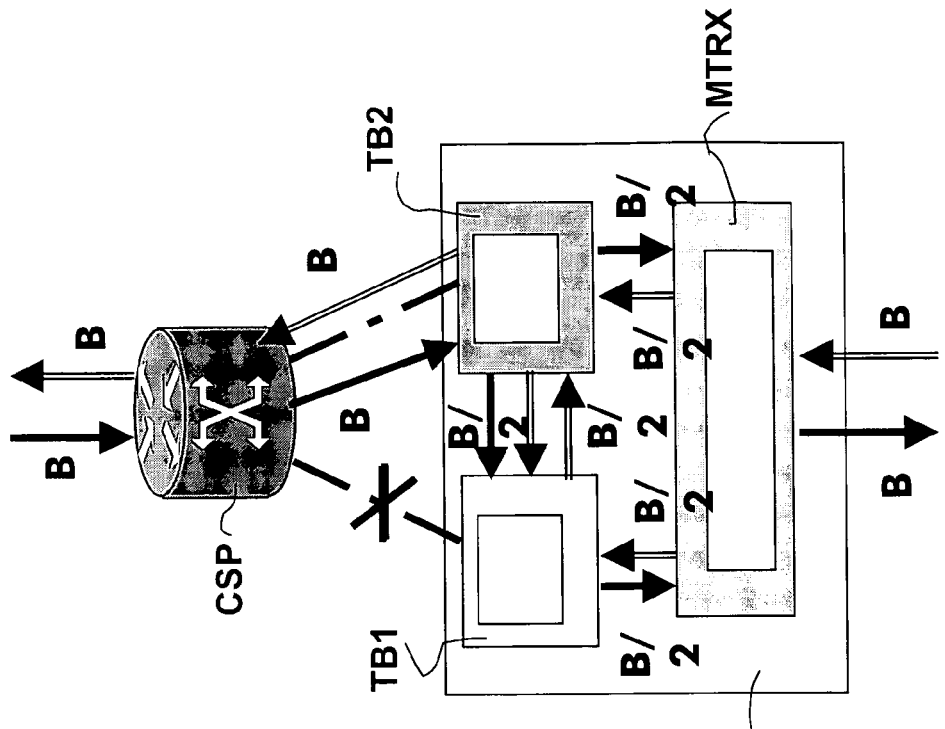
FIGS. 2 to 5 show logical schematic diagrams of the internal constitution of the Transport Network Hub TNH according to the invention, in different protection situations.
Figure 2:
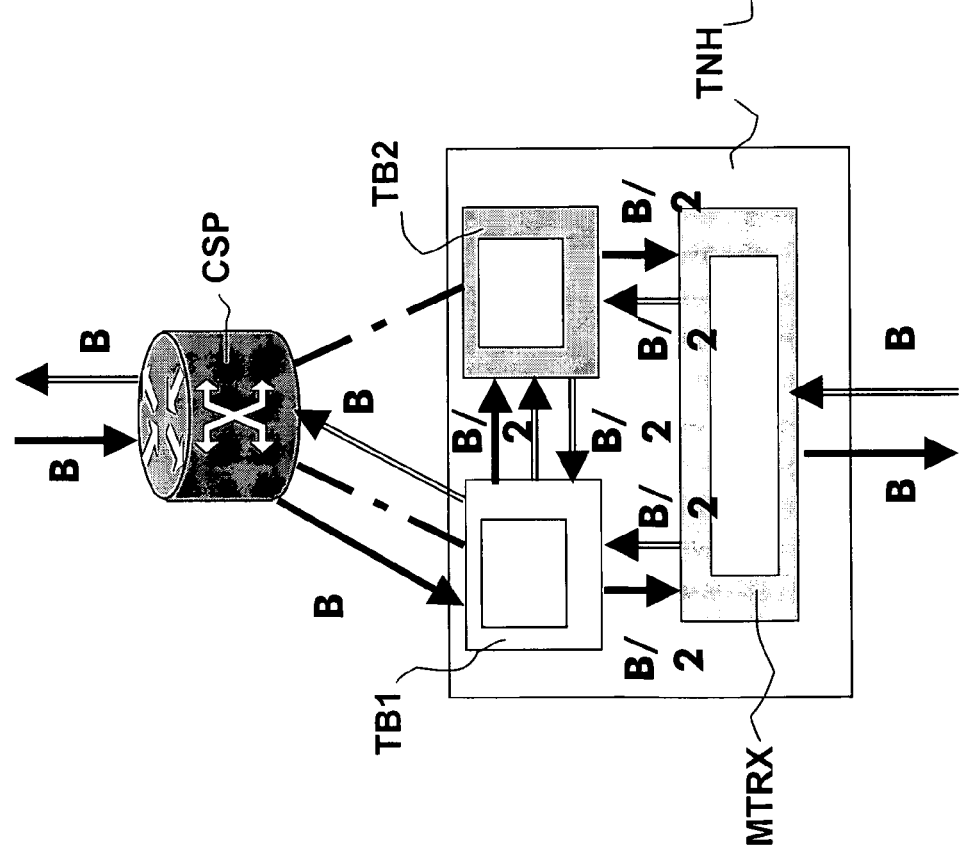

As shown in FIG. 3, a failure in the link connected to the board connected to CSP (TB1 in the figure), has the following consequence.

The Spanning-Tree Algorithm will change selection, and all the traffic previously sent to the Ethernet interface of TB1 (bandwidth B) will now be sent to TB2. Consequently TB2 will send B/2 bandwidth directly to the Matrix MTRX and B/2 bandwidth to TB1. In this case there is a traffic rerouting between boards TB1 and TB2, and the relating Up-Down B/2 bandwidth will change flow direction between the two boards.

In the following advatageously embodiments of the inventive method are summarized. In a preferred embodiment the method is characterized in that it further provides for bi-casting from each board TB1, TB2, the B/2 bandwidth received from the Switching Matrix MTRX to both the Central Site/Pop CSP and the other board, so that a total bandwidth B is available at both boards outputs towards the Central Site/Pop CSP made up of a bandwidth B/2 coming from the same board and B/2 coming from the other board.

In another preferred embodiment the method is characterized in that it provides for sending out the B/2 bandwidth of customer's traffic to the Central Site/Pop CSP with no knowledge whether the latter will process or discard it, following the decision on which board TB1 or TB2 must be connected to the Central Site/Pop CSP made by a Spanning-Tree Algorithm running in the Central Site/Pop CSP.

In a further preferred embodiment the method is characterized in that it further provides for giving in each board higher priority to the B/2 bandwidth coming from the Central Site/Pop CSP and directed to the other board, with respect to the B/2 bandwidth coming from the Switching Matrix MTRX and bi-casted to the other board in the same direction.

In a still further embodiment the method is characterized in that, in case of a board failure, it provides for:
rerouting the B/2 bandwidth of the failed board coming from the Switching Matrix (MTRX) to the other board by the Switching Matrix (MTFX), in this case the only working board being connected to the Switching Matrix (MTRX) with bandwidth B;
forwarding the B/2 bandwidth coming from the Central Site/Pop (CSP) and directed to the failed board directly to the Switching Matrix (MTRX).

In another embodiment the method is characterized in that in case of link failure, it provides for:
rerouting the traffic between the two boards (TB1, TB2), so as the B/2 bandwidth coming from the Central Site/Pop (CSP) will change flow direction between the two boards.

The embodiments could be combined with each other.

The first to seventh means in claims 2 to 7 could be implemented as one equal means like a controller or as different means, e.g. regarding hardware, or software (e.g. different software modules, packets, parts, etc.), or a mixture of hard- and software.

Many changes, modifications, variations and other uses and applications of the subject invention will become apparent to those skilled in the art after considering the specification and the accompanying drawings which disclose preferred embodiments thereof.

In the following a more generic devide will be discribed which covers all the above mentionned embodiments and even more. The device is applicable to all kind of transport networks.

The generic device for the interconnection of a transport network and an Ethernet network, the device comprises:
a first board, a second board, a matrix, and a controller,
the first board including an Ethernet interface to receive and transmit Ethernet data,
the second board including an Ethernet interface to receive and transmit Ethernet data,
the matrix including an interface to the transport network to receive and transmit transport data, and being intercnnected with the first and the second board in order to exchange data,
the controller being interconnected with the first and the second board and the matrix in order to control the exchanged data flow,
the controller being programmed to control the forwarding of part A of the Ethernet data received by the first board directly to the matrix and of another part B of the Ethernet data received by the first board to the matrix including a transmission via the second board,
the controller being programmed to control the forwarding of part B of the Ethernet data received by the second board directly to the matrix and of another part A of the Ethernet data received by the second board to the matrix including a transmission via the first board, the controller being further programmed to control the forwarding of part A of the transport data received by the matrix to the first board directly and a copy to the second board, and the forwarding of another part B of the transport data received by the matrix to the second board directly and a copy to the first board.

The device could e.g. be a transport network hub or a transport module having at least two Ethernet interfaces, or part of a Cross-Connect, an Add-Drop-Multiplexer, a wavelength division multipexer, an optical multi service node, etc. The controller could be a microprocessor or a digital signal processor, an FPGA, an ASIC, or the like. Part of the received data could be 50% or more or less, another part could be 50% or less or more.

In a preferred embodiment the device is characterized in that the controller is programmed to switch one of the boards active regarding sending Ethernet data via the Ethernet interface and the other board not active regarding sending Ethernet data via the Ethernet interface, and both boards active regarding sending and receiving control information via the Ethernet interfaces. The decision which of the boards shall be active is e.g. taken by the router CSP and forwarded to the controller. Alternatively it is taken by the controller itself.

In a further preferred embodiment the device is characterized in that the controller is programmed to switch the first board active in case the second board does not receive Ethernet data via the Ethernet interface. A trigger pulse to switch is e.g. provided by router CSP. Alternatively the controller decides on his own.

In a further embodiment the device is characterized in that the controller is programmed to switch the first board active in case the second board has a malfunction, and to reroute the other part of the Ethernet data received by the first board also directly to the matrix, and to reroute the other part of the transport data received by the matrix also directly to the first board. A trigger pulse to switch is e.g. provided by router CSP. Alternatively the controller decides on his own.

The invention claimed is:

1. A method of protecting a connection between a hub of a transport network and a central site/pop via Ethernet interfaces, the hub comprising a switching matrix for data traffic to and from the transport network, and two boards bidirectionally connected to both the switching matrix and the central site/pop, the method comprising:

receiving at one of the two boards downstream data traffic of a total connection bandwidth B from the central site/pop;

sending B/2 of the downstream data traffic from the one board to the switching matrix directly, and the other B/2 of the downstream data traffic from the one board to the switching matrix through the other board of the two boards; and receiving, at each of the two boards, B/2 of upstream data traffic directly from the switching matrix and the other B/2 of the upstream data traffic, from the other board of the two boards, which is rerouted to the other board from the switching matrix.

2. A hub of a transport network for protecting a connection between the transport network and a central site/pop via Ethernet interfaces, the hub comprising:

a switching matrix for data traffic to and from the transport network;

two boards bidirectionally connected to both the switching matrix and the central site/pop;

a first unit that controls one of the two boards to receive downstream data traffic of a total connection bandwidth B from the central site/pop, send B/2 of the downstream data traffic from the one board to the switching matrix directly, and send the other B/2 of the downstream data traffic from the one board to the switching matrix through the other board of the two boards; and a second unit that controls each of the two boards to receive B/2 of upstream data traffic directly from the switching matrix and the other B/2 of the upstream data traffic, from the other board of the two boards, which is rerouted to the other board from the switching matrix.

3. The hub according to claim 2, further comprising a third unit that controls each of the two boards to bi-cast B/2 of the upstream data traffic received from the switching matrix to both the central site/pop and the other board of the two boards, so that a total bandwidth B of the upstream data traffic is available at an output of each of the two boards toward the central site/pop, the B of the upstream data traffic comprising B/2 coming from the each of the two boards and B/2 coming from the other board of the two boards.

4. The hub according to claim 3, further comprising a fourth unit that controls B/2 of the upstream data traffic to the central site/pop with no knowledge whether the central site/pop is to process or discard the B/2 of the upstream data traffic, following a decision on which of the two boards must be connected to the central site/pop configured under a spanning-tree algorithm running in the central site/pop.

5. The hub according to claim 3, further comprising a fifth unit that controls each of the two boards to give higher priority to B/2 of downstream data traffic coming from the central site/pop and directed to the other board of the two boards, with respect to B/2 of upstream data traffic coming from the switching matrix and bi-casted to the other board of the two boards in a same direction.

6. The hub according to claim 2, further comprising a sixth unit that, in case of a failure of one of the two boards:

reroutes B/2 of upstream data traffic directed to the failed board from the switching matrix to the other board of the two boards, in which case the other board being the only working board and connected to the switching matrix with a bandwidth B; and forwards B/2 of downstream data traffic coming from the central site/pop and directed to the failed board directly to the switching matrix.

7. The hub according to claim 2, further comprising a seventh unit that, in case of a link failure between one of the two boards and the central site/pop, reroutes data traffic between the two boards so that B/2 of downstream data traffic coming from the central site/pop changes a flow direction between the two boards.

8. Device for the interconnection of a transport network and Ethernet, the device comprising:

a first board; a second board; a matrix; and a controller, wherein the first board including an Ethernet interface to receive and transmit Ethernet data, the second board including an Ethernet interface to receive and transmit Ethernet data, the matrix including an interface to the transport network to receive and transmit transport data, and being interconnected with the first and the second board in order to exchange data, and the controller being interconnected with the first and the second board and the matrix in order to control the exchanged data flow, the controller being programmed to control the forwarding of part of the Ethernet data received by the first board directly to the matrix and of another part of the Ethernet data received by the first board to the matrix including a transmission via the second board, the controller being programmed to control the forwarding of part of the Ethernet data received by the second board directly to the matrix and of another part of the Ethernet data received by the second board to the matrix including a transmission via the first board, and the controller being further programmed to control the forwarding of part of the transport data received by the matrix to the first board directly and a copy to the second board, and the forwarding of another part of the transport data received by the matrix to the second board directly and a copy to the first board.

9. Device according to claim 8, characterized in that the controller is programmed to switch one of the boards active regarding sending Ethernet data via the Ethernet interface and the other board not active regarding sending Ethernet data via the Ethernet interface, and both boards active regarding sending and receiving control information via the Ethernet interfaces.

10. Device according to claim 8, characterized in that the controller is programmed to switch the first board active in case the second board does not receive Ethernet data via the Ethernet interface.

11. Device according to claim 8, characterized in that the controller is programmed to switch the first board active in case the second board has a malfunction, and to reroute the other part of the Ethernet data received by the first board also directly to the matrix, and to reroute the other part of the transport data received by the matrix also directly to the first board.

* * * * *